J. W. BERCAW.
LAUNDRY WASHING MACHINE.
APPLICATION FILED MAR. 23, 1915.
Reissued June 8, 1915. 13,922.
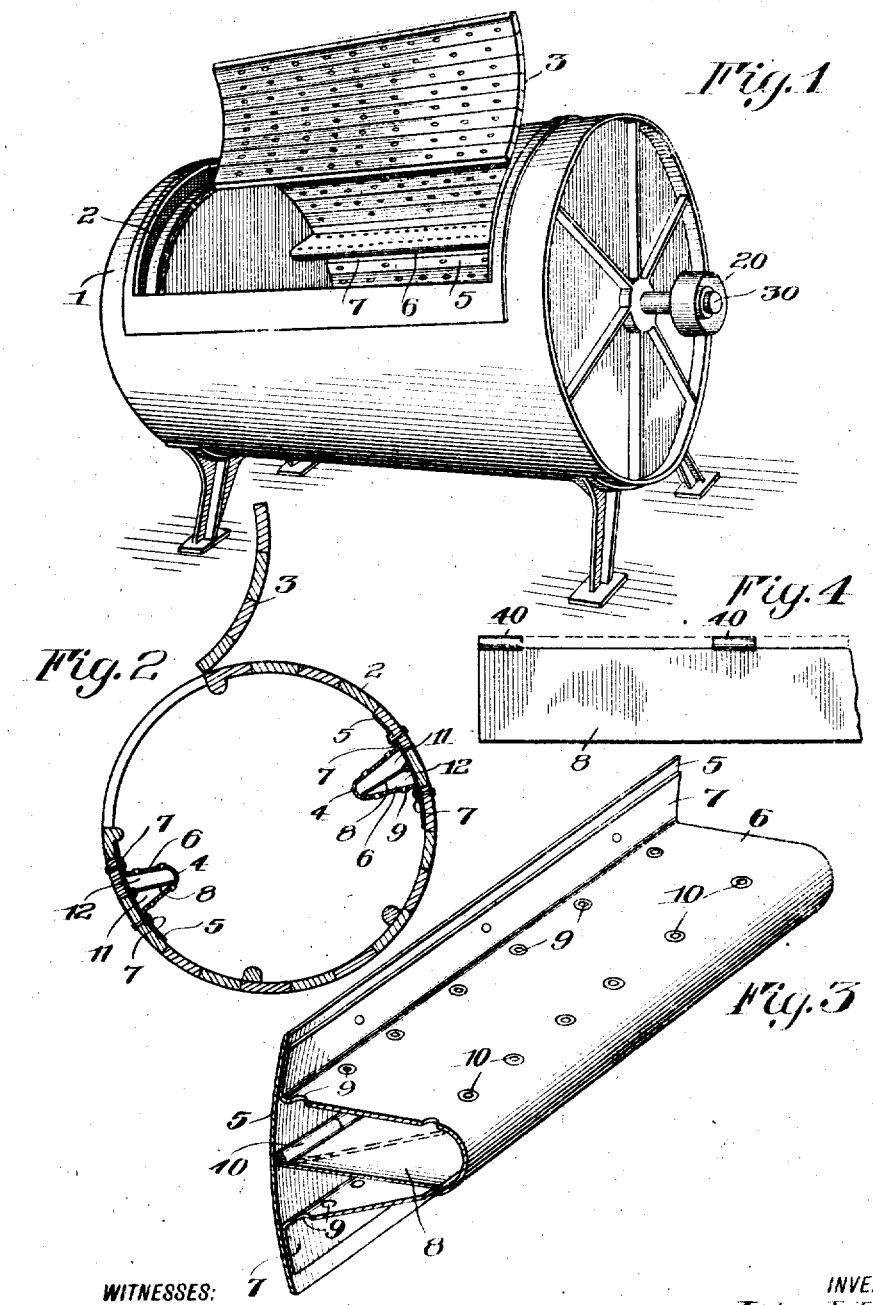
WITNESSES:
Nelson H. Copp
Walter B. Payne
INVENTOR
John W. Bercaw
BY
Church & Rich
his ATTORNEYS

UNITED STATES PATENT OFFICE.

JOHN W. BERCAW, OF HAMILTON, OHIO, ASSIGNOR TO THE AMERICAN LAUNDRY MACHINERY COMPANY, OF NORWOOD, OHIO, A CORPORATION OF OHIO.

LAUNDRY-WASHING MACHINE.

Specification of Reissued Letters Patent. Reissued June 8, 1915.

13,922.

Original No. 1,111,126, dated September 22, 1914, Serial No. 768,501. Application for reissue filed March 23, 1915. Serial No. 16,480.

*To all whom it may concern:*

Be it known that I, JOHN W. BERCAW, a citizen of the United States, residing at Hamilton, in the county of Butler and State of Ohio, have invented certain new and useful Improvements in Laundry-Washing Machines, of which the following is a specification.

My invention relates to an improvement in a laundry clothes washing machine.

The object of my invention is to provide for effectively obviating the tangling of clothes in washing machines of the type embodying a rotary container, and to manipulate the clothes in such a manner as to cleanse them quickly, without subjecting them to any knotting or tearing action.

Another valuable result produced is a distinct increment in the cleansing efficiency of a machine embodying my improvement and a consequent material reduction in the time required for washing a given load.

The features of my improvement will be more fully set forth in the description of the accompanying drawings, forming a part of this specification, disclosing the preferred embodiment of my invention, in which:—

Figure 1 is a front elevation of a washing machine showing the inner cylinder door opened to exhibit my improvement as applied. Fig. 2 is a central vertical section through the inner cylinder. Fig. 3 is a perspective view of a detached clothes manipulating member partly in section. Fig. 4 is a plan view, partly broken away, of a detached interior element of the clothes manipulating member.

The hollow, horizontal cylinders 1 and 2, form the tub and washer of the machine. The tub is stationary and the perforated washer cylinder rotatable therein, each provided with a door in the usual manner, the inner cylinder door 3 being shown in Figs. 1 and 2. The inner cylinder is rotatably supported in the tub and may be suitably driven by connecting from a source of power to the driving wheel 20, and axial shaft 30, there being a clearance space between the tub and inner cylinder.

The clothes manipulating and auxiliary washing member 4 is shown detached in Fig. 3, and applied to the interior of the perforated cylinder 2 in Fig. 1. It preferably comprises a segmental imperforate base 5, to which is attached the hollow rib 6, preferably formed of sheet metal, flanged at its adjacent ends 7 for attachment to the base 5. The chamber so formed is preferably wider at the base, having a rounded nose-like end to engage the clothes, projecting radially toward the cylinder axis. Arranged within this chamber is a liquid controlling or valve-functioning member which is movable and coöperates alternately with the walls of the rib to form a water holding compartment, and in the present construction the valve-functioning member, designated at 8, is hinged at the medial longitudinal line of the base by means of suitable connections 40, and extends inwardly, its end terminating in the projecting end of the chamber and contacting alternately with the walls of the rib, the latter being formed with inlet orifices 9 at the base and outlet orifices 10 in proximity to the clothes engaging end of the rib. The unitary member so formed is suitably secured to the inner surface of the washing cylinder. When two members 4 are employed, as shown, I preferably dispose them diametrically, with the first member placed, say 8 or 10 inches below the lower sill of the cylinder-door, so that the clothes will lie under said members in the bottom of the cylinder when brought to door-opening position.

I prefer the unitary structure illustrated, not only because of its convenient assembly into an organized machine, for factory manufacture, but because it can be shipped or applied as an accessory element to commercial machines of this general type, its use being obviously not restricted to a double cylinder washing machine, but being broadly applicable to various kinds of washing tubs.

Of course the segmental base could be omitted, and the chamber formed by the sheet metal structure could be attached directly to the inner cylinder, but I prefer that the floor of this chamber should be imperforate in order to more reliably affect the contemplated water flows through the orifices 9 and 10.

In practice, the wash water stands in the tub appreciably below the axial line, and the inner cylinder carries a proportionate load of clothes, the inner cylinder being rotated periodically in opposite directions.

Assuming the direction of a given rotation to be as indicated by the arrow, Fig. 2, the member 8 will have moved on its hinge to bring its extremity against the inner surface of the lower or advancing chamber wall, forming an advancing water compartment 11 and a following water compartment 12, into which the water flows as the member dips below the water level. The outer surface of the advancing wall and rounded nose will engage the clothes and move them in the general direction of rotation, lifting them above water level as it emerges. When the rib 6 emerges above the water level, the member 8 will have swung to its other position, and as compartment 12 is raised above the water level, the water will flow from the under orifices 10, striking the clothes, while in a little higher position the compartment 11 will be so tilted as to pour water from the uppermost orifices 10, thus not only tending to dislodge or disentangle the clothes, but materially increasing the cleansing efficiency by effectively dashing the wash water against the clothes when carried above the water level, serving also to increase the water agitation and inducing maximum water flows and currents. The clothes are thus not only prevented from entanglement, but are thoroughly subjected to additional washing treatments, and agitation, with minimum knotting and rending influences.

Having described my invention, I claim:—

1. The combination with a rotary container, of a clothes manipulating and washing member projecting inwardly from its inner surface and comprising a hollow rib forming a chamber having orifices in its opposite walls and a movable valve functioning member coöperating alternately with the opposite walls of the chamber and forming a water holding compartment.

2. The combination with a rotary container, of a clothes manipulating and washing member projecting inwardly from its inner surface and comprising a hollow rib forming a chamber having orifices in its opposite walls and a valve functioning member pivotally mounted for swinging movement and coöperating alternately with the walls of the chamber and forming a water holding compartment.

3. The combination with a rotary container, of a clothes manipulating and washing member projecting inwardly from its inner surface and comprising a base, a hollow rib thereon forming a chamber having orifices in its opposite walls and a valve functioning member pivoted to the base to swing from one side of the chamber to the other and coöperating alternately with the walls of the chamber and forming a water holding compartment.

In witness whereof, I hereunto subscribe my name, as attested by the two subscribing witnesses.

JOHN W. BERCAW.

Witnesses:

Agnes Nesbitt Bissell,
H. E. Stonebraker.